(12) United States Patent
Takehara

(10) Patent No.: US 6,953,220 B2
(45) Date of Patent: Oct. 11, 2005

(54) HOOD APPARATUS FOR A VEHICLE

(75) Inventor: Makoto Takehara, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/963,727

(22) Filed: Oct. 14, 2004

(65) Prior Publication Data
US 2005/0082873 A1 Apr. 21, 2005

(51) Int. Cl.$^7$ .................... B60R 21/34; B62D 25/10
(52) U.S. Cl. .................... 296/187.04; 296/187.09; 296/193.11; 180/69.2; 180/69.21
(58) Field of Search .................... 296/187.04, 187.09, 296/146.8, 193.11; 180/69.2, 69.21, 274

(56) References Cited

U.S. PATENT DOCUMENTS

| | | | |
|---|---|---|---|
| 6,257,657 B1 * | 7/2001 | Sasaki | 296/187.09 |
| 6,330,734 B1 * | 12/2001 | Cho | 16/376 |
| 6,439,330 B1 * | 8/2002 | Paye | 180/69.21 |
| 6,442,801 B1 * | 9/2002 | Kim | 16/361 |
| 6,520,276 B2 * | 2/2003 | Sasaki et al. | 180/274 |
| 6,588,526 B1 * | 7/2003 | Polz et al. | 180/69.21 |
| 6,755,268 B1 * | 6/2004 | Polz et al. | 180/69.21 |
| 6,789,834 B2 * | 9/2004 | Schlegel | 296/76 |
| 6,802,556 B2 * | 10/2004 | Mattsson et al. | 296/187.09 |
| 2002/0017409 A1 * | 2/2002 | Peter | 180/69.2 |
| 2002/0043417 A1 * | 4/2002 | Ishizaki et al. | 180/274 |

FOREIGN PATENT DOCUMENTS

JP    3377763 B2    12/2002

* cited by examiner

*Primary Examiner*—Patricia L. Engle
*Assistant Examiner*—Greg Blankenship
(74) *Attorney, Agent, or Firm*—Birch, Stewart, Kolasch & Brich, LLP (57) ABSTRACT

A hood apparatus for a vehicle has a hood member which closes an opening of an engine room, a lifting mechanism, and a driving portion. The lifting mechanism has a link mechanism and a gas spring. The link mechanism is structured so as to be able to raise up and bring down the hood member by including a first link member and a second link member shorter than the first link member which bridge the hood member and a top end portion of a strut house panel of the engine room. The gas spring urges the hood member upward. The driving portion uncouples the second link member from the hood member when an impact force greater than or equal to a predetermined value is inputted from an front end portion of a automobile.

10 Claims, 9 Drawing Sheets

HOOD APPARATUS FOR A VEHICLE

CROSS-REFERENCE TO RELATED APPLICATIONS

This application is based upon and claims the benefit of priority from prior Japanese Patent Application No. 2003-355446, filed Oct. 15, 2003, the entire contents of which are incorporated herein by reference.

BACKGROUND OF THE INVENTION

1. Field of the Invention

The present invention relates to a hood apparatus for a vehicle in which a deformation stroke of the hood member is ensured by lifting up a hood member.

2. Description of the Related Art

In an automobile, generally, an engine is placed on an engine room whose top portion is opened. The automobile has a hood apparatus for a vehicle. The hood apparatus for a vehicle has a hood member covering the opening of the engine room, and a lifting mechanism lifting up the hood member when the hood member is opened. The lifting mechanism has a link mechanism, a gas spring, or the like. The link mechanism links the hood member and the opening edge of the engine room together, and makes the hood member be able to be raised up from and brought down to, the opening edge. The gas spring urges the hood member upward.

On the other hand, in an automobile in which an engine room is positioned at the front side, in a case of a collision from the front end portion of the vehicle body, or the like, there are cases in which an impact force due to the collision is inputted from the top surface of the hood member. However, an engine and various auxiliary machinery for the engine are disposed under the hood member, and a space between the hood member and the engine or the like is narrow. Therefore, because a deformation stroke of the hood member cannot be sufficiently ensured, it is difficult to sufficiently buffer the impact force inputted to the hood member. Therefore, the impact force applied to the hood member should be effectively buffered.

For example, in a hood apparatus for a vehicle disclosed in Japanese Patent No. 3377763, in order to effectively buffer an impact force added to the hood member, a springing-up mechanism springing up the hood member by a predetermined amount is separately dedicatedly provided. The springing-up mechanism increases a space between the hood member and the engine or the like by springing up the hood member when an impact force is inputted to the front end portion of the vehicle body due to a collision or the like. In accordance therewith, a deformation stroke of the hood member is more ensured. Therefore, the impact force added to the hood member is buffered.

However, the hood apparatus for a above-described needs a spring-up mechanism, provided independently of a lifting mechanism to spring up the hood member. Therefore, the structure of the hood apparatus for a vehicle is made complicated, and the cost of the hood apparatus for a vehicle is made to be high.

BRIEF SUMMARY OF THE INVENTION

The present invention is to provide a hood apparatus for a vehicle which can effectively buffer an impact force with a simple structure in which parts of a lifting mechanism are utilized.

The hood apparatus for a vehicle of the present invention comprises a hood member, a lifting mechanism, and a uncoupling mechanism. The hood member is configured to close an upper opening of a chamber space portion having an upper opening. The chamber space portion is formed in front of a cabin of a vehicle. The lifting mechanism which lifts the hood member includes a link mechanism and urging device. The link mechanism rises up and brings down the hood member. The link mechanism has a first link member and a second link member. The second link member is shorter than the first link member. The first link member and the second link member bridge the hood member and the opening edge portion of the upper opening. The first link member and second link member are spaced in the longitudinal direction of the vehicle. The hood member is linked to the first link member and the second link member at the opening edge portion of the upper opening to turn freely. The urging device urges the hood member upward. The uncoupling mechanism uncouples the second link member from the hood member when an impact force greater than or equal to a predetermined value is inputted from an front end portion of the vehicle. In the hood apparatus for a vehicle structured in this way, when an impact force greater than or equal to the predetermined value is inputted from the front end portion of the vehicle, the hood member is made to spring upward by an urging force of the urging device.

According to the structure, the hood apparatus for a vehicle does not need a spring-up mechanism spring up the hood member separately, and springs up the hood member by utilizing the lifting mechanism. Therefore, the hood apparatus for a vehicle has a simple structure, and yet can effectively buffer the impact force applied to the hood member. Therefore, the hood apparatus for a vehicle can suppress the cost thereof.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
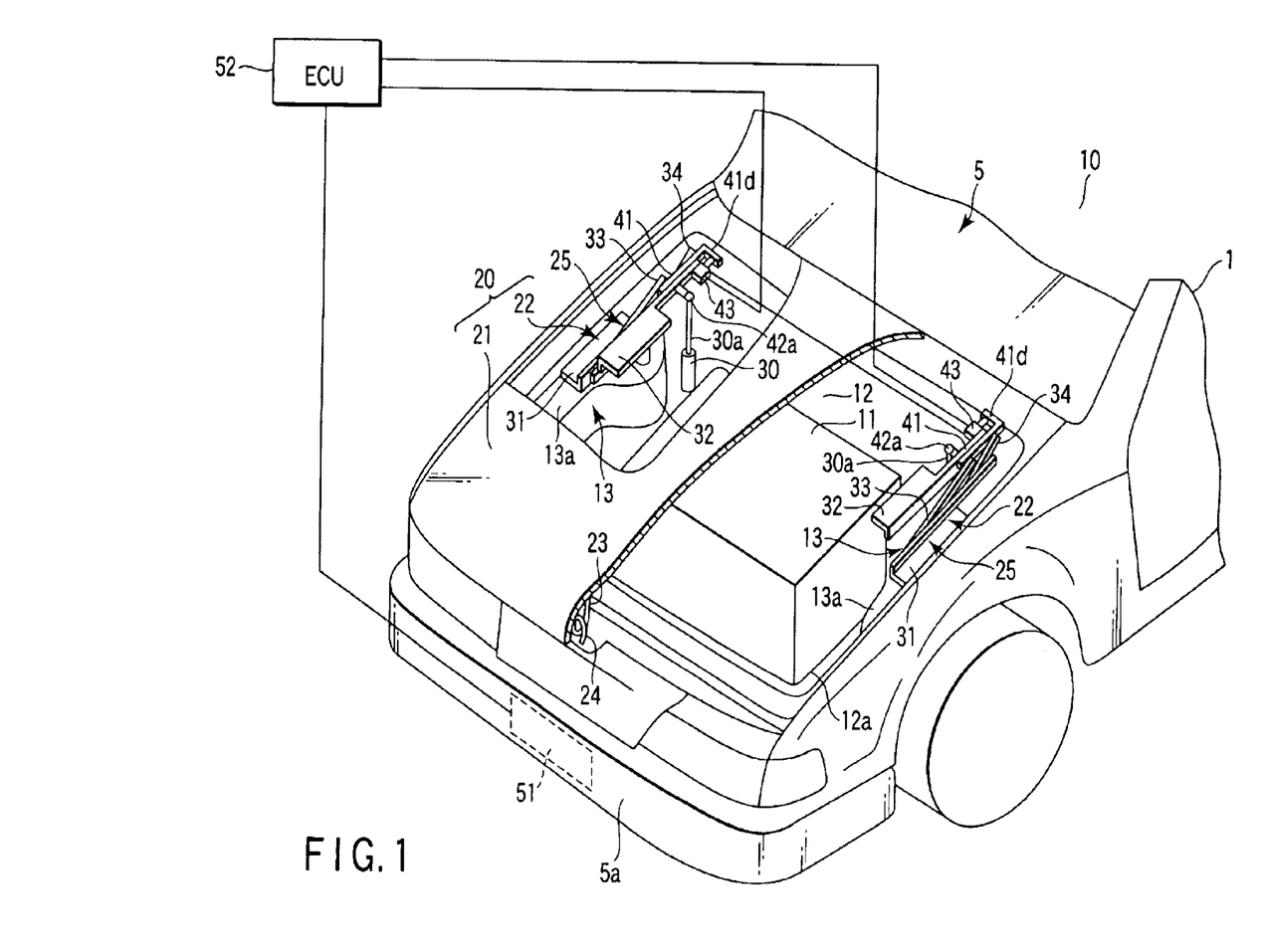
FIG. 1 is a perspective view showing a front side of a vehicle, which is partially cut away, relating to a first embodiment of the present invention.

A hood apparatus for a vehicle relating to a first embodiment of the present invention will be described with reference to FIG. 1 through FIG. 7. FIG. 1 shows the front side of an automobile 1 as one example of the vehicle. The automobile 1 is, for example, an FF (Front engine, Front wheel drive) system. An engine room 12 is provided at a side which is further toward the front than a cabin 10 at a vehicle body 5 of the automobile 1. An opening 12a, or upper opening, opened upward is formed above the engine room 12. An engine 11 is placed in the engine room 12, or chamber space portion.

The automobile 1 has, for example, strut type suspension devices as front suspensions respectively at the both ends in the vehicle width direction. Strut house panels 13 in which the struts of the strut type suspension devices are housed are provided at the both ends in the vehicle width direction of the engine room 12. A top end portion 13a of the strut house panel 13 has, for example, a predetermined width in the vehicle width direction, and is substantially horizontal along the longitudinal direction of the automobile 1.

The automobile 1 has a hood apparatus for a vehicle 20. The hood apparatus for a vehicle 20 has a hood member 21 and a pair of lifting mechanisms 22. The hood member 21 covers the opening 12a of the engine room 12 from the upper side. The lifting mechanisms 22 respectively link the hood member 21 and the side of the vehicle body 5 of the automobile together in the rear sides of the both ends in the vehicle width direction of the hood member 21. Then, the respective lifting mechanisms 22 respectively lift the hood member 21 substantially upward from the front-end side of the vehicle.

The hood member 21 has, for example, a striker 23 at the front-end portion, in order to engage with the side of the vehicle body 5. A latch 24 engaging with the striker 23 is provided at the side of the vehicle body 5. In a state in which the hood member 21 is closed, the front end of the hood member 21 is fixed to the side of the vehicle body 5 due to the striker 23 and the latch 24 engaging with one another.

Figure 2:
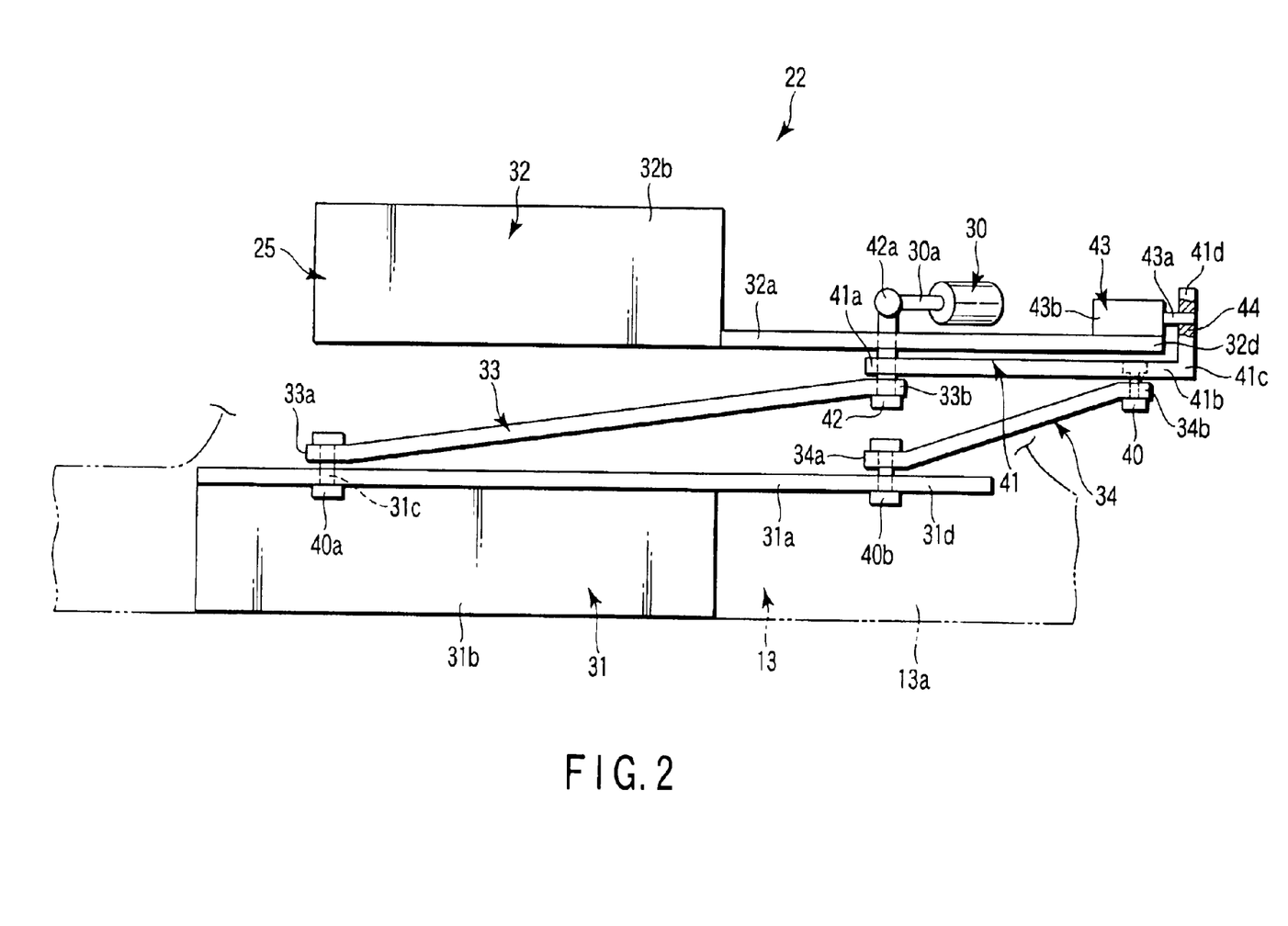
FIG. 2 is a plan view showing a state in which a lifting mechanism, which is disposed at the left side of a vehicle body, relating to the first embodiment of the present invention is brought down.

FIG. 2 shows a state in which the lifting mechanism which is disposed at the left side of the vehicle body 5 is looked at from the top, in a state in which the hood member 21 is closed. Note that, because the lifting mechanisms 22 are respectively provided to be substantially symmetrical at the left and right of the vehicle body 5, the lifting mechanism 22 at the left side of the vehicle body 5 will be typically described hereinafter.

The lifting mechanism 22 has a link mechanism 25 and a gas spring 30. The link mechanism 25 links the hood member 21 and the side of the vehicle body 5, for example, a top end portion 13a of the strut house panel 13, or an opening edge portion, of the engine room 12 together.

Figure 3A:
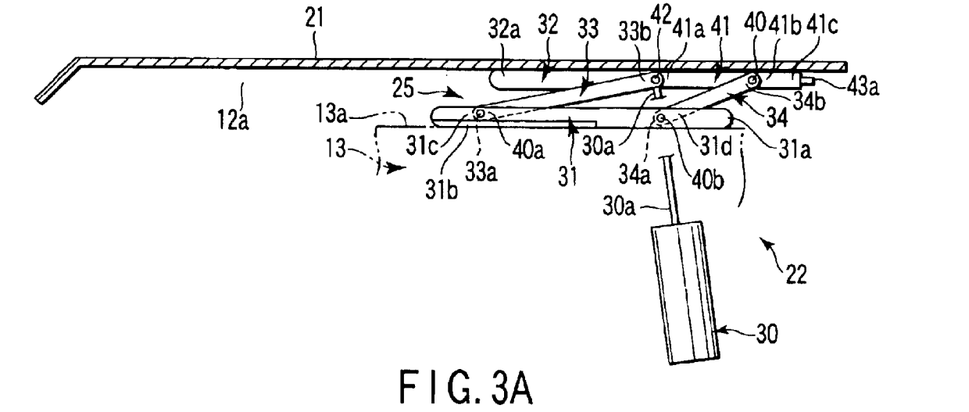
FIG. 3A is a side view showing a state of looking at the state, from the outside in the vehicle width direction, in which the lifting mechanism, which is disposed at the left side of the vehicle body, relating to the first embodiment of the present invention is brought down.
Figure 3B:
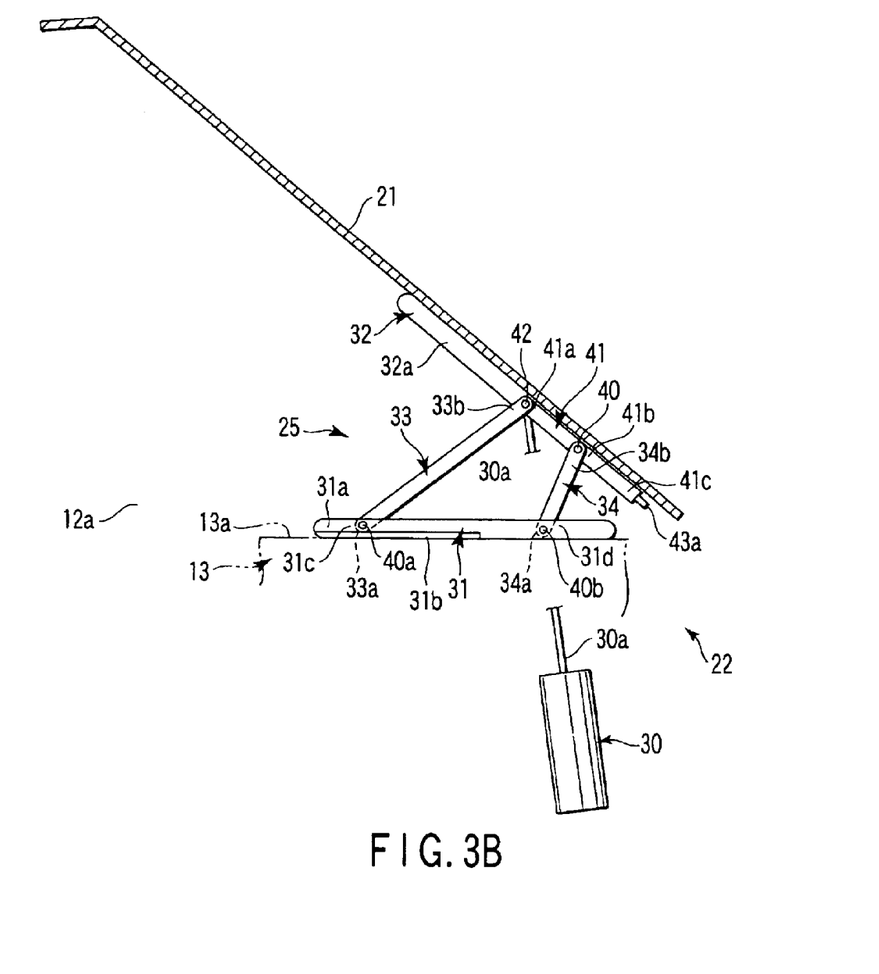
FIG. 3B is a side view showing a state of looking at the state, from the outside in the vehicle width direction, in which a lifting mechanism, which is disposed at the left side of the vehicle body, relating to the first embodiment of the present inventions raised up.

The link mechanism 25 can be raised up and brought down. As shown in FIG. 3A, a state in which the link mechanism 25 is brought down is a state in which the opening 12a of the engine room 12 is closed by closing the hood member 21. As shown in FIG. 3B, a state in which the link mechanism 25 is raised up is a state in which the opening 12a of the engine room 12 is opened by lifting up the hood member 21 upward.

The gas spring 30, or urging device, applies a force to the hood member 21, pushing substantially upwards.

As shown in FIG. 2, the link mechanism 25 has a vehicle-side fixing member 31, a hood-side fixing member 32, a first link member 33, and a second link member 34. The vehicle-side fixing member 31 is fixed to the top end portion 13a of the strut house panel 13. The hood-side fixing member 32 is fixed to the hood member 21. The first and second link members 33 and 34 bridge the vehicle-side fixing member 31 and the hood-side fixing member 32 so as to be one behind another in the longitudinal direction of the vehicle body 5.

The vehicle-side fixing member 31 has a vehicle side arm portion 31a and a vehicle side flange 31b. The vehicle side arm portion 31a extends in substantially the longitudinal direction along the top end portion 13a of the strut house panel 13. The cross-section of the vehicle side arm portion 31a is, for example, substantially a rectangle. The vehicle side flange 31b is provided from the front end over substantially the center of the vehicle side arm portion 31a, and spreads to the outer side in the vehicle width direction along the top end portion 13a of the strut house panel 13. The vehicle-side fixing member 31 is fixed to the top end portion 13a of the strut house panel 13 by, for example, unillustrated bolts and nuts.

The hood-side fixing member 32 has a hood side arm portion 32a and a hood side flange 32b. The hood side arm portion 32a extends in substantially the longitudinal direction along the inner surface of the hood member 21. The cross-section of the hood side arm portion 32a is, for example, substantially a rectangle.

The hood side flange 32b is provided from the front end over substantially the center of the hood side arm portion 32a, and spreads to the inner side in the vehicle width direction along the inner surface of the hood member 21. The hood-side fixing member 32 is fixed by, for example, unillustrated bolts and nuts, to a position which is nearer to the inner side in the vehicle width direction side from a position facing the vehicle-side fixing member 31 in a state in which the hood member 21 is closed.

The first link member 33 is disposed at the front of the vehicle, between the vehicle-side fixing member 31 and the hood-side fixing member 32 that are spaced in the vehicle width direction. The second link member 34 is disposed at the rear end side of the vehicle between the vehicle-side fixing member 31 and the hood-side fixing member 32 that are spaced in the vehicle width direction. Namely, the second link member 34 is disposed at the side which is further toward the rear than the first link member 33 in the longitudinal direction.

One end portion 33a at the side of the vehicle-side fixing member 31 of the first link member 33 is supported so as to turn freely by, for example, a pin 40a at the inner surface in the vehicle width direction of a front side portion 31c of the vehicle side arm portion 31a. The pin 40a passes through the one end portion 33a and the front side portion 31c.

One end portion 34a at the side of the vehicle-side fixing member 31 of the second link member 34 is supported so as to turn freely by, for example, a pin 40b at the inner surface in the vehicle width direction of the rear side portion 31d of the vehicle side arm portion 31a. The pin 40b passes through the one end portion 34a and the rear side portion 31d.

Respective one end portions 33b and 34b, at the hood-side fixing member 32 side, of the first link member 33 and the second link member 34 are supported by an intermediate link member 41 so as to be freely rotatable. Because the intermediate link member 41 is supported by the hood-side fixing member 32, the first link member 33 and the second link member 34 bridge the vehicle-side fixing member 31 and the hood-side fixing member 32.

The intermediate link member 41 is provided between the first link member 33 and second link member 34, on the other hand, and the hood-side fixing member 32, on the other hand, for example, along the vehicle width direction. The one end portion 33b, at the hood-side fixing member 32 side, of the first link member 33 is supported so as to turn freely by, for example, a pin 42 at the outer surface in the vehicle width direction of a front end 41a of the intermediate link member 41. The pin 42 passes through the one end portion 33b and the front end 41a.

The one end portion 34b, at the hood-side fixing member 32 side, of the second link member 34 is supported so as to turn freely by, for example, a pin 40 at the outer surface in the vehicle width direction of a rear side portion 41b of the intermediate link member 41. The pin 40 passes through the one end portion 34b and the rear side portion 41b.

The second link member 34 is shorter than the first link member 33. When the hood member 21 is fully opened, i.e., when the link mechanism 25 is made to be in a state of being raised up, the engine room 12 can be looked over due to the hood member 21 being inclined as shown in FIG. 3B.

The lengths of the first link member 33 and the second link member 34, and a length between the one end portion 33a the one end portion 34a and a length between the one end portion 33b and the one end portion 34b at the vehicle-side fixing member 31 and the intermediate link member 41 are respectively adjusted so as to be able to sufficiently look over the engine room 12.

A supporting structure between the intermediate link member 41 and the hood-side fixing member 32 will be described in detail. As shown in FIG. 2, the pin 42 passes through the front end 41a of the intermediate link member 41, and extends toward the hood-side fixing member 32. Moreover, the pin 42 passes through the hood side arm portion 32a of the hood-side fixing member 32. In accordance therewith, the front end 41a of the intermediate link member 41 is supported at the hood-side fixing member 32 so as to turn freely.

Further, a bent portion 41d is provided at a rear end 41c of the intermediate link member 41. The bent portion 41d bends toward the inner side in the vehicle width direction from the rear end 41c at the side which is further toward the rear than the rear end 32d of the hood side arm portion 32a.

A solenoid device 43 is provided at the rear end 32d of the hood side arm portion 32a so as to face the bent portion 41d.

The solenoid device 43 has a shaft portion 43a slid in the longitudinal direction and a driving portion 43b sliding the shaft portion 43a. At the bent portion 41d, an insertion hole 44 into which the shaft portion 43a of the solenoid device 43 can be inserted is formed. Therefore, the hood-side fixing member 32 and the bent portion 41d of the intermediate link member 41 are supported by one another due to the shaft portion 43a of the solenoid device 43 being inserted into the insertion hole 44 of the bent portion 41d.

Figure 4:
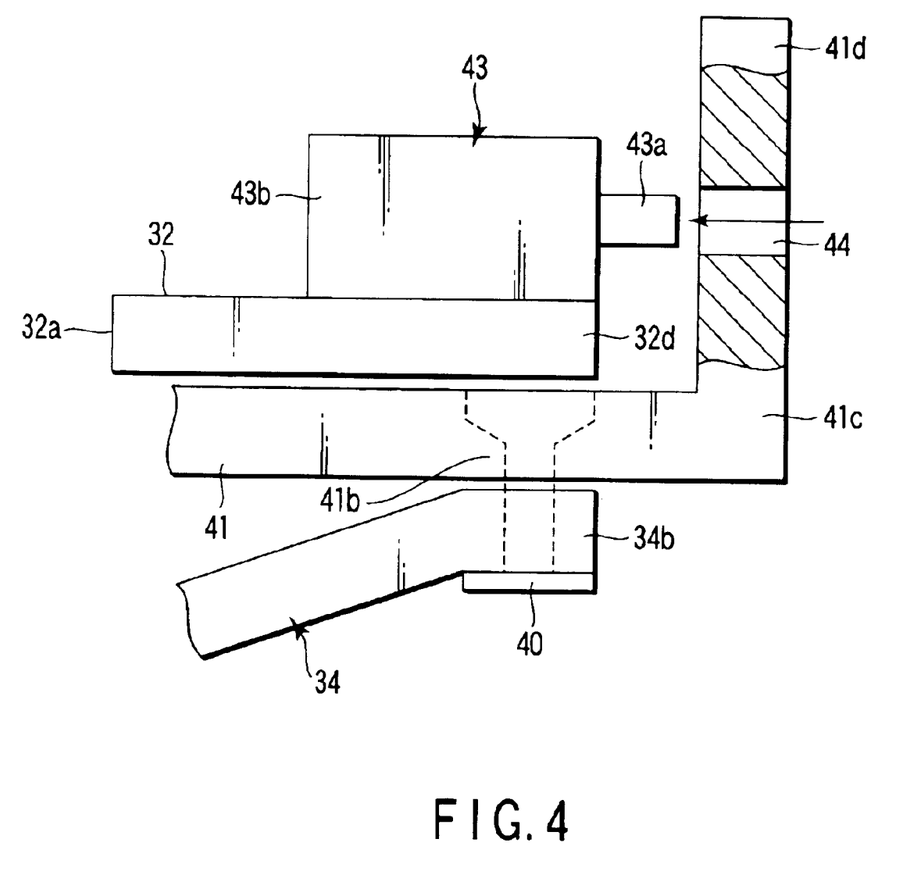
FIG. 4 is a plan view showing a situation of releasing support between a bent portion of an intermediate link member and a rear end of a hood-side fixing member, which is partially cut away, relating to the first embodiment of the present invention.

Moreover, as shown in FIG. 4, the support between the hood-side fixing member 32 and the bent portion 41d of the intermediate link member 41 is released, when the driving portion 43b slides the shaft portion 43a to pull it out of the insertion hole 44. In accordance therewith, both of the one end portion 34b, at the hood-side fixing member 32 side, of the second link member 34 and the intermediate link member 41 are uncoupled from the hood-side fixing member 32.

Namely, the insertion hole 44 and the shaft portion 43a support both of the one end portion 34b, at the hood-side fixing member 32 side, of the second link member 34 and the intermediate link member 41 at the hood-side fixing member 32. Namely, the insertion hole 44 and the shaft portion 43a constitute one example as a supporting unit which is referred to as in the present invention.

The driving portion 43b of the solenoid device 43 releases the support between the hood-side fixing member 32 and the bent portion 41d of the intermediate link member 41 by sliding the shaft portion 43a. The driving portion 43b function as uncoupling mechanism and as a supporting shaft sliding mechanism for sliding the shaft portion 43a.

In this way, the intermediate link member 41 is supported so as to be integrated with the hood-side fixing member 32 due to the front end 41a and the bent portion 41d being respectively supported at the hood-side fixing member 32.

According to the aforementioned structure, the link mechanism 25 links the top end portion 13a of the strut house panel 13 and the hood member 21 together. As shown in FIG. 3A, the link mechanism 25 is folded in a state in which the hood member 21 is closed, i.e., a state in which the link mechanism 25 is brought down. As shown in FIG. 3B, the link mechanism 25 is raised up in a state in which the hood member 21 is opened.

The bottom end of the gas spring 30 is supported by, for example, the bottom of the engine room 12. The gas spring 30 has a rod portion 30a. As shown in FIG. 2, the pin 42 passes through the hood side arm portion 32a of the hood-side fixing member 32, and further extends toward the inner side in the vehicle width direction. One end of the rod portion 30a of the gas spring 30 is supported by an end portion 42a at the inner side of the vehicle width direction of the pin 42.

For example, the gas spring 30 keeps exerting a force on the pin 42, urging the pin 42 substantially upward. In accordance therewith, for example, when an occupant releases the engagement between the striker 23 and the latch 24, the hood member 21 is opened up to a full open position by the urging force of the gas spring 30.

As shown in FIG. 1, the hood apparatus for a vehicle 20 has an impact force detecting sensor 51 and an ECU 52 connected to the impact force detecting sensor 51. The impact force detecting sensor 51 is provided at, for example, a front end portion 5a of the vehicle body 5. When an impact force is inputted to the front end portion 5a of the vehicle body 5, the impact force detecting sensor 51 detects a value of the impact force and transmits the information to the ECU 52.

The ECU 52 is connected to the driving portion 43b of the solenoid device 43. When the impact force inputted to the front end portion 5a of the vehicle body 5 is greater than or equal to a predetermined value, as shown in FIG. 4, the ECU 52 controls the driving portion 43b to slide the shaft portion 43a so as to be pulled out of the insertion hole 44. In accordance therewith, the support between the bent portion 41d and the hood-side fixing member 32 is released.

Figure 5:
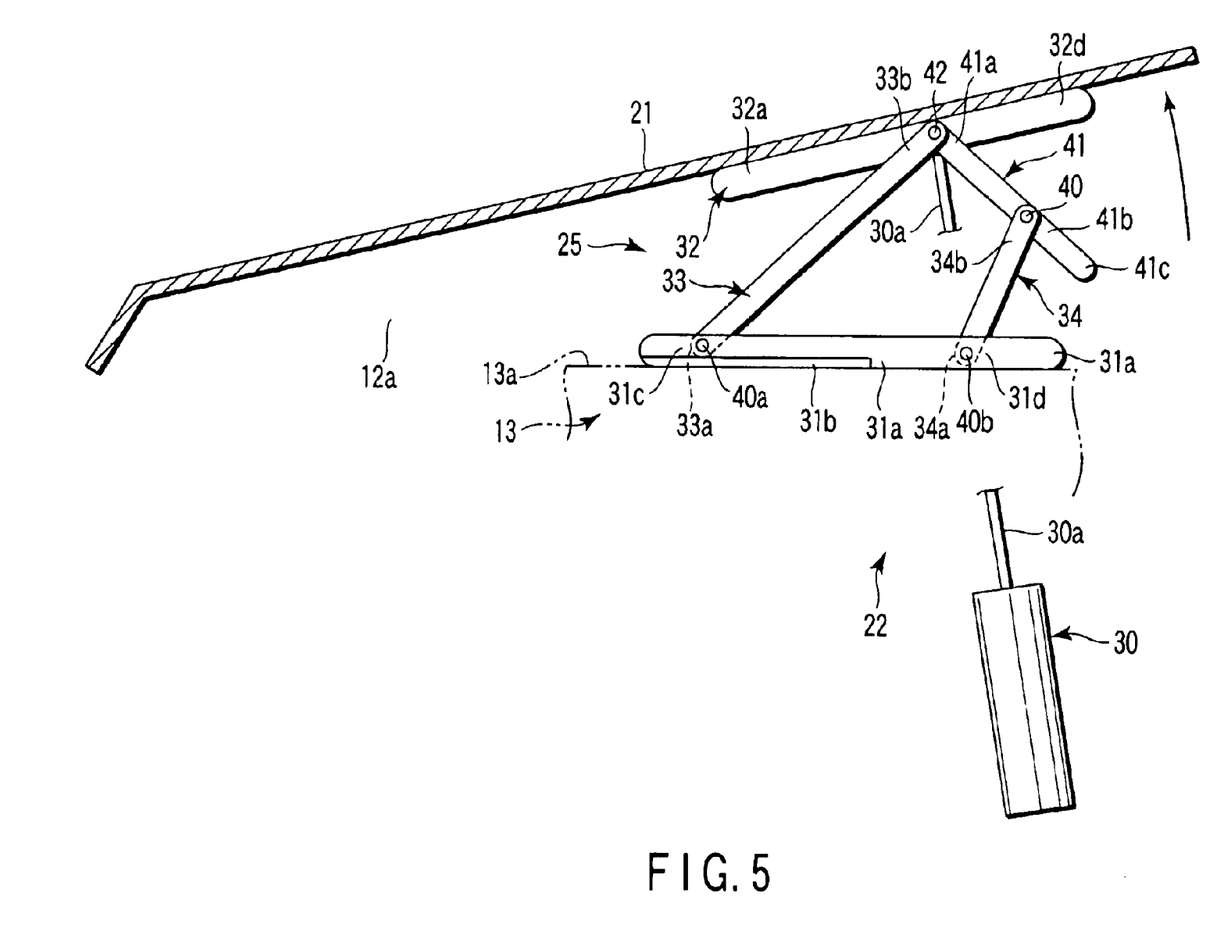
FIG. 5 is a side view showing a state of looking at a state, from the outside in the vehicle width direction, in which a hood member relating to the first embodiment of the present invention is sprung up.

When the support between the bent portion 41d and the hood-side fixing member 32 is released, the support between the intermediate link member 41 and the hood-side fixing member 32 is made to be only the support at the front end 41a of the intermediate link member 41. Additionally, the support between the front end 41a of the intermediate link member 41 and the hood-side fixing member 32 is made so as to turn respectively freely. Therefore, as shown in FIG. 5, when the support between the bent portion 41d and the hood-side fixing member 32 is released, the hood member 21 is made to spring upward by the urging force of the gas spring 30.

At that time, because the first link member 33 springs up along with the hood-side fixing member 32, the first link member 33 is made to be in a state of being raised up. Moreover, because the second link member 34 is linked with the first link member via the intermediate link member 41, the second link member 34 is made to be in a state of being raised up along with the first link member 33. Namely, the link mechanism is made to be in a state of being raised up.

Namely, when an impact force is inputted from the front end portion 5a of the vehicle body 5 due to the automobile 1 having a collision with, for example, an block while the automobile 1 is running, or the like, the impact force detecting sensor 51 detects a value of the impact force. The information of the value of the impact force detected by the impact force detecting sensor 51 is transmitted to the ECU 52.

When the impact force is greater than or equal to a predetermined value, as shown in FIG. 4, the driving portion 43b pulls the shaft portion 43a out of the insertion hole 44 under the control of the ECU 52. In accordance therewith, the support between the bent portion 41d of the intermediate link member 41 and the hood-side fixing member 32 is released.

Next, as shown in FIG. 5, the hood member 21 is made to spring up by the urging force of the gas spring 30. In accordance therewith, the distance between the engine 11 and the auxiliary machinery at the periphery thereof, and the hood member 21 is lengthened. Due to the distance between the engine 11 and the auxiliary machinery at the periphery thereof, and the hood member 21 being made longer, a deformation stroke of the hood member 21 is increased as shown by the chain double-dashed line in FIG. 6.

Figure 6:
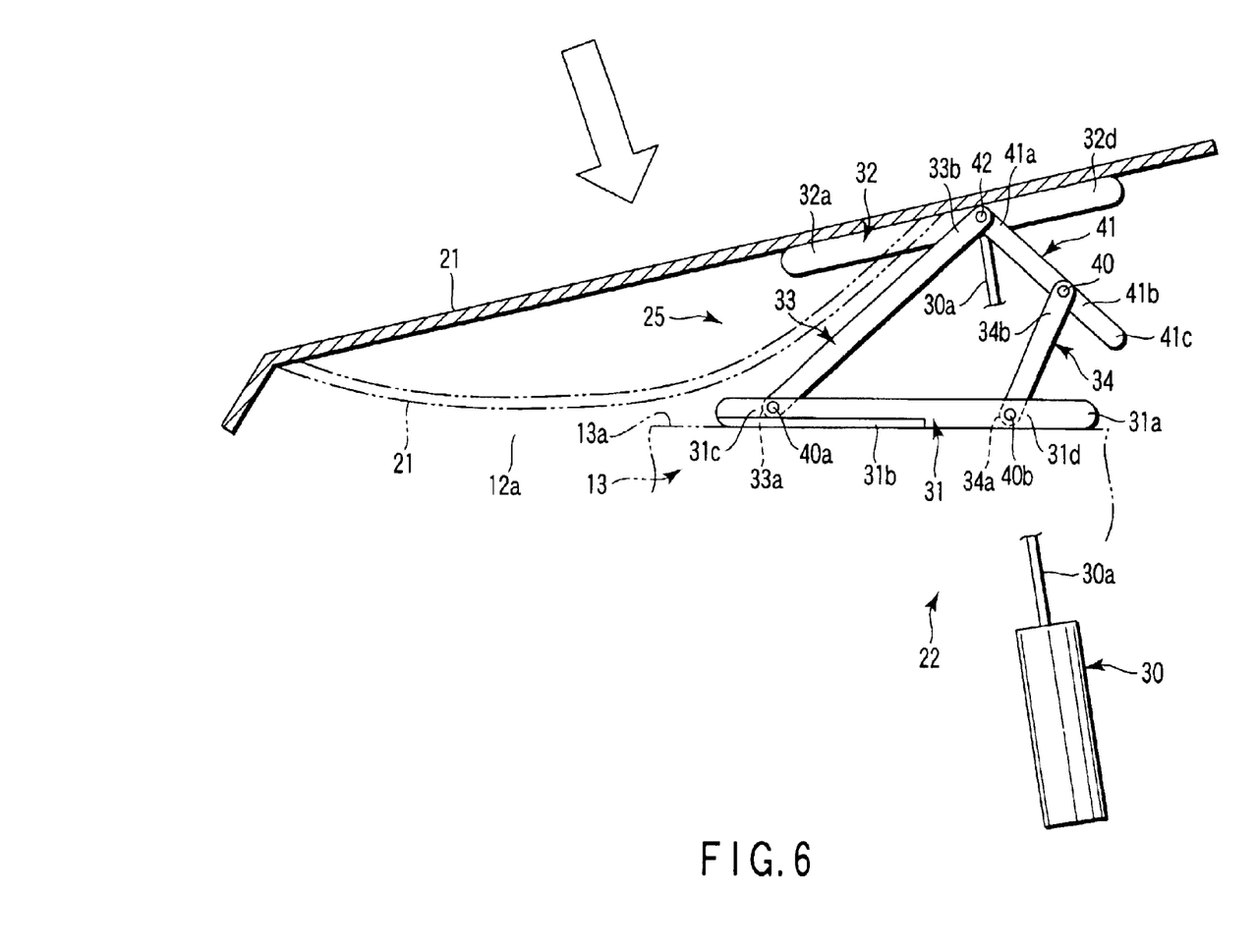
FIG. 6 is a side view showing a state of looking at a situation, from the outside in the vehicle width direction, of a deformation of the hood member relating to the first embodiment of the present invention.

Therefore, even if an impact force is inputted from the top surface of the hood member 21 due to an obstacle falling down on the top surface of the hood member 21 by a collision, or the like, the impact force is sufficiently absorbed. Moreover, because the urging force of the gas spring 30 absorbs an impact force, the impact force inputted to the hood member 21 is effectively absorbed. Note that the hood member 21 after being deformed is shown by the chain double-dashed line.

Figure 7:
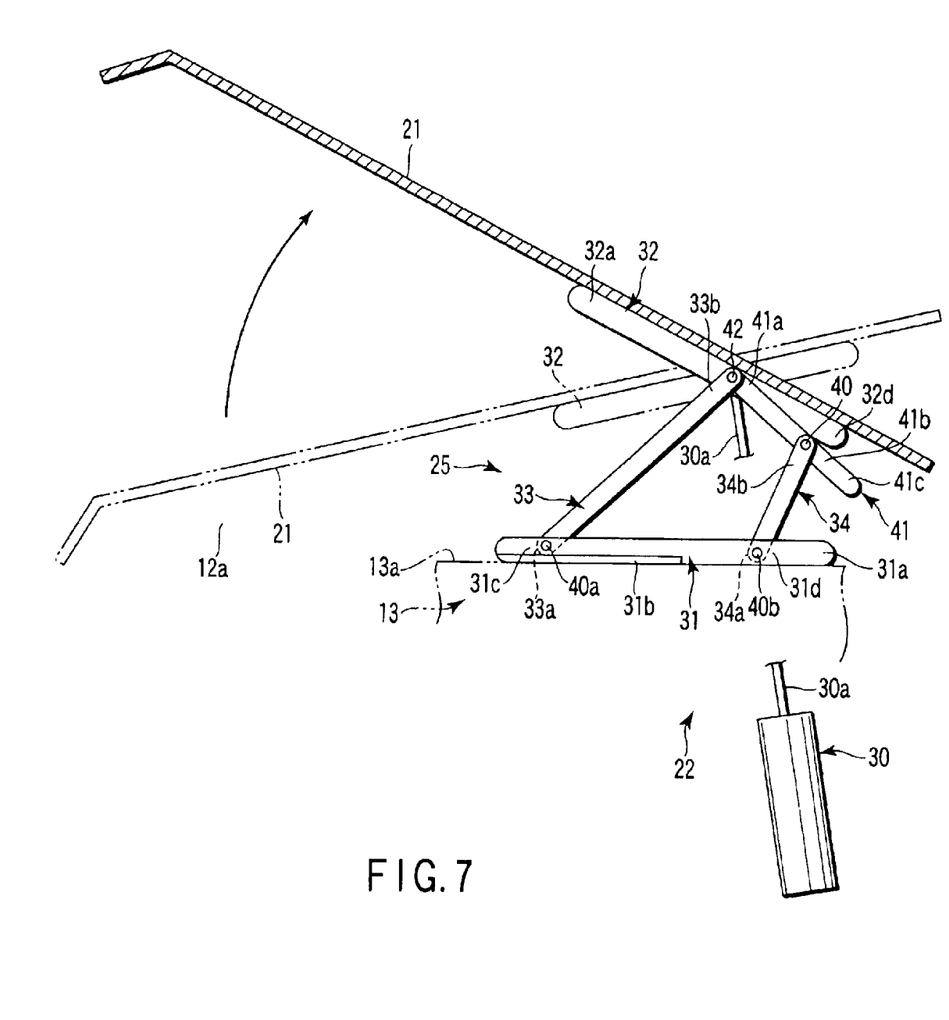
FIG. 7 is a side view showing a state of looking at a situation, from the outside in the vehicle width direction, in which a state of spring up the hood member relating to the first embodiment of the present invention is released.

Further, in a state in which the hood member 21 is made to spring up, the link mechanism 25 is in a state of being raised up. In this state, when the hood member 21 is raised up as shown in FIG. 7, the hood member 21 is made to be in a state of full-open as shown in FIG. 3B. In this state, the insertion hole 44 of the bent portion 41d of the intermediate link member 41 and the shaft portion 43a of the solenoid device 43 are made to face one another. Note that, in FIG. 7, the state in which the hood member 21 is raised up is shown by the chain double-dashed line.

At that time, when a deformation of the hood member 21 is slight, the hood member 21 can be restored to the original state. To describe it concretely, for example, the driving portion 43b of the solenoid device 43 is manually operated, and the shaft portion 43a is inserted into the insertion hole 44 again. The bent portion 41d of the intermediate link member 41 is thereby supported at the hood-side fixing member 32 again. In this sate, the hood member 21 can be closed. In this way, the hood member 21 covers the opening 12a of the engine room 12 in a state before the hood member 21 is made to spring up.

According to the hood apparatus for a vehicle 20 having the above-described structure, when an impact force greater than or equal to a predetermined value is inputted to the front end portion 5a of the vehicle body 5, the support between the hood-side fixing member 32 and the bent portion 41d is released. Then, the hood member 21 is made to spring up, and the deformation stroke of the hood member 21 is increased. In accordance therewith, the impact force inputted to the hood member 21 is effectively buffered by the deformation of the hood member 21 and the urging force of the gas spring 30.

Here, most of the parts of the lifting mechanism 22 structure the spring-up mechanism spring up the hood member 21. Therefore, a dedicated spring-up mechanism is not necessary separately, the structure of the hood apparatus for a vehicle 20 is simplified. Therefore, the cost of the hood apparatus for a vehicle 20 is suppressed.

Further, by using the structure in which the first link member 33 and the second link member 34 are linked with one another via the intermediate link member 41, the link mechanism 25 is made to be in a state of being raised up when the hood member 21 is made to spring up.

Therefore, due to merely the hood member 21 being fully opened after the hood member 21 was made to spring up, and the shaft portion 43a being inserted into the insertion hole 44, the hood member 21 is restored to the state before being made to spring up. Therefore, a state in which the hood member 21 is being made to spring up can be easily released.

Further, the intermediate link member 41 is supported at the hood-side fixing member 32 by the front end 41a and the bent portion 41d provided at the rear end 41c. Therefore, when the hood-side fixing member 32 rotates relative to the intermediate link member 41 with the front end 41a of the intermediate link member 41 as a supporting point, pushing force applied between the shaft portion 43a of the solenoid device 43 and the insertion hole 44 is suppressed to being low.

Therefore, the force to slide the shaft portion 43a can be suppressed. Namely, because there is no need to make the driving portion 43b large, the cost of the hood apparatus for a vehicle 20 can be suppressed.

Further, due to the solenoid device 43 being installed at the rear end 32d of the hood side arm portion 32a of the hood-side fixing member 32, and the insertion hole 44 being provided at the bent portion 41d, the respective portions can be provided at relatively spacious places. Therefore, the solenoid device 43 can be easily disposed, and the insertion hole 44 can be easily provided. Namely, the working efficiency in a case in which these are disposed or provided is improved.

Further, due to the second link member 34 being disposed in the rear of the first link member 33, the hood member 21 can be opened from the front of the automobile 1. In accordance therewith, the hood member 21 can be easily opened.

Further, by using the structure in which the support between the hood-side fixing member 32 and the intermediate link member 41 is released by sliding the shaft portion 43a, the hood apparatus for a vehicle 20 can support both of the hood-side fixing member 32 and the intermediate link member 41 with a simple structure, and can simply release the support by merely sliding the shaft portion 43a.

Further, the solenoid device 43 comprises the solenoid device 43a (supporting unit) and the driving portion 43b (uncoupling mechanism). Namely, an increase in the number of man-hours for assembling the hood apparatus for a vehicle 20 caused by respective shaft portion 43a and driving portion 43b are separately handled is suppressed.

Note that, although the insertion hole 44 is provided at the intermediate link member 41, the present invention is not limited thereto. For example, a bent portion facing the bent portion 41d is provided at the hood-side fixing member 32, and the insertion hole 44 may be formed at the bent portion. In this case, the solenoid device 43 may be disposed at the bent portion 41d of the intermediate link member 41. Further, the solenoid device 43 is used for the support between the bent portion 41d of the intermediate link member 41 and the hood-side fixing member 32. However, the present invention is not limited thereto.

Next, the support between the intermediate link member 41 and the hood-side fixing member 32 of the hood apparatus for a vehicle 20 relating to a second embodiment of the present invention will be described with reference to FIG. 8, and FIG. 9A and FIG. 9B. Note that structure having the same functions as those of the first embodiment are denoted with the same reference numerals, and descriptions thereof will be omitted.

Figure 8:
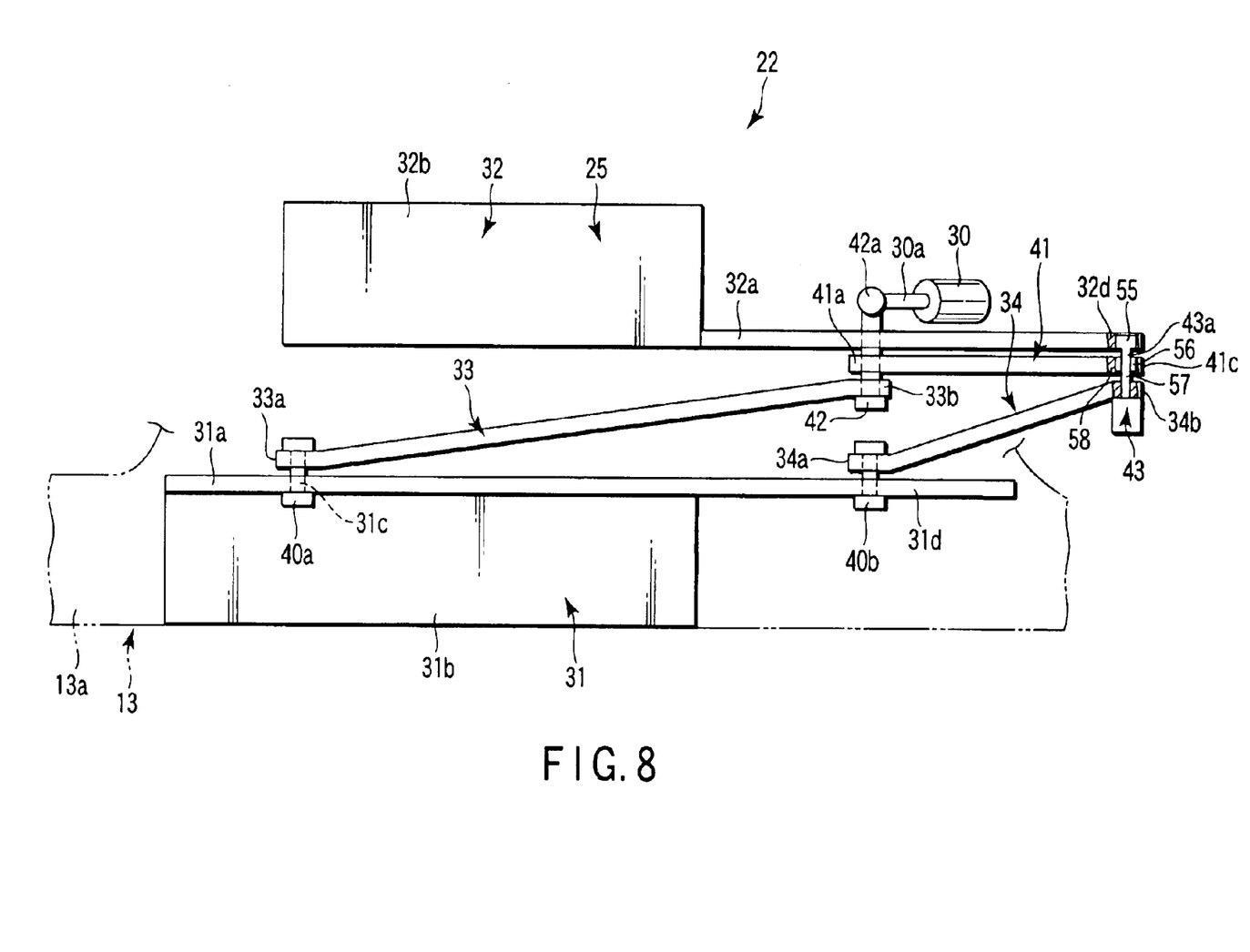
FIG. 8 is a plan view showing a state in which a lifting mechanism, which is disposed at the left side of the vehicle body, relating to a second embodiment of the present invention is brought down.

FIG. 8 shows a state in which the lifting mechanism 22 relating to the second embodiment which is disposed at the left side of the vehicle body 5 is looked from the top in a state in which the hood member 21 is closed. Note that, because the supporting structure between the front end 41a of the intermediate link member 41 and the hood-side fixing member 32 may be the same as in the first embodiment, description thereof will be omitted here.

Figure 9A:
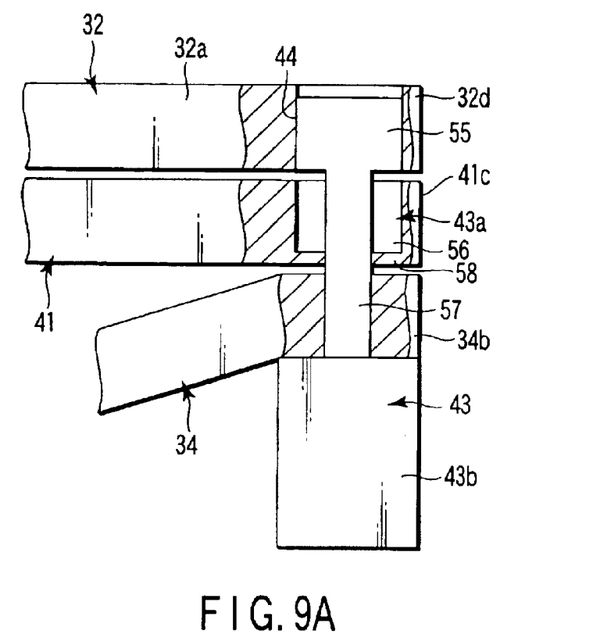
FIG. 9A is a plan view showing a situation of support between a rear end of an intermediate link member and a rear end of a hood-side fixing member, which is partially cut away, relating to the second embodiment of the present invention.
Figure 9B:
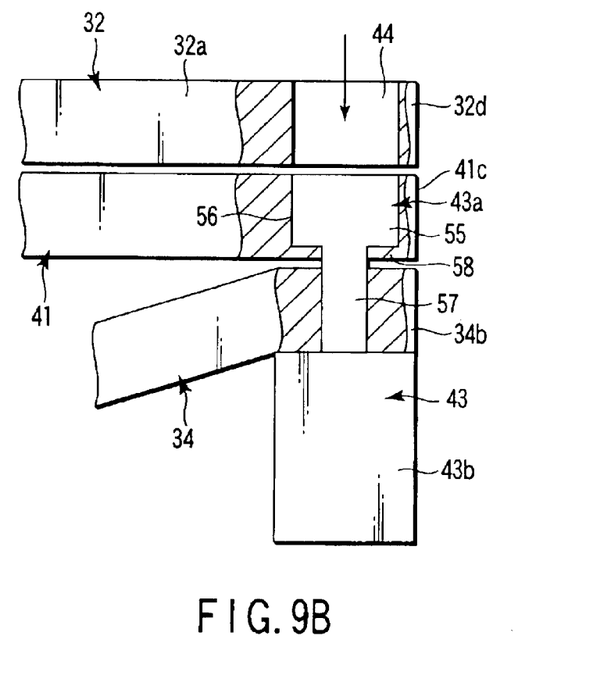
FIG. 9B is a plan view showing a situation of releasing of support between the rear end of the intermediate link member and the rear end of the hood-side fixing member, which is partially cut away, relating to the second embodiment of the present invention.

FIG. 9A and FIG. 9B show the vicinity of the rear end 41c of the intermediate link member 41 which is enlarged. The solenoid device 43 is fixed to that surface of end portion 34b of the hood-side fixing member 34, which faces away from the intermediate link member 41. Note that the portion 34b is provided at the hood-side fixing member 32.

The insertion hole 44 into which the shift portion 43a is inserted is formed at the rear end 32d of the hood side arm portion 32a of the hood-side fixing member 32. The one end portion 34b of the second link member 34, the rear end 41c of the intermediate link member 41, and the rear end 32d of the hood side arm portion 32a are arranged in a row. Note that the end portion 34b is located near side of the vehicle. The rear end 32d is located nearer to the inner side in the vehicle width direction than the end portion 34b. The rear end 41c is located between the rear end 32d and the end portion 34b. In accordance therewith, the end portion 34b of the second link member 34, the rear end 41c of the intermediate link member 41, and the rear end 32d of the hood side arm portion 32a are supported so as to turn respectively freely due to the shaft portion 43a passing through those.

In the shaft portion 43a, the portion which inserted into the hood side arm portion 32a of the hood-side fixing member 32 is made to be a large diameter portion 55 thicker than the other portion. The insertion hole 44 is formed to receive the large diameter portion 55. In the second embodiment, the insertion hole 44 function as supporting shaft bearing which is referred to as in the present invention.

Further, at the intermediate link member 41, an insertion hole 56 into which the large diameter portion 55 of the shaft portion 43a can be inserted is provided. As shown in FIG. 9B, due to the driving portion 43b of the solenoid device 43 sliding the shaft portion 43a toward the side of the second link member 34, the large diameter portion 55 of the shaft portion 43a is pulled out of the insertion hole 44 and is housed in the insertion hole 56 of the intermediate link member 41. In accordance therewith, the support between the shaft portion 43a and the hood-side fixing member 32 is released.

Further, the second link member 34 side of the insertion hole 56 is made to be a narrowed portion 58. The narrowed portion 58 is constricted into a diameter which is substantially the same as that of a base portion 57 of the shaft portion 43a. The base portion 57 is thinner than the large diameter portion 55. Therefore, because the base portion 57 of the shaft portion 43a is supported at the narrowed portion 58 in the intermediate link member 41, the intermediate link member 41 is prevented from being shaky. Moreover, when the shaft portion 43a is slid, due to the large diameter portion 55 touching the narrowed portion 58, the shaft portion 43a is prevented from being pulled out of the intermediate link member 41.

In the second embodiment, not only the rear end 41c of the intermediate link member 41 is supported at the hood-side fixing member 32, but also the portions from the second link member 34 up to the hood side arm portion 32a of the hood-side fixing member 32 are supported by the shaft portion 43a.

Therefore, in addition to the effect of the first embodiment, a supporting unit or a supporting structure for supporting the second link member 34 and the intermediate link member 41 one another is not necessary separately. Therefore, in the hood apparatus for a vehicle 20, the number of parts is reduced, or the structure thereof is simplified.

Moreover, there is no need to form a region linked with the hood-side fixing member 32 at the intermediate link member 41 at positions over the respective supporting point ranges of the first link member 33 and the second link member 34 at the intermediate link member 41. Namely, the intermediate link member 41 should have a length corresponding to the respective supporting point ranges of the first link member 33 and the second link member 34. Thus, the intermediate link member 41 is small, and the link mechanism 25 is compact.

Further, due to the driving portion 43b being fixed to the one end portion 34b of the second link member 34, and sliding the shaft portion 43a toward the second link member 34 side, the support between the hood-side fixing member 32 and the intermediate link member 41 is released.

Namely, because it is sufficient that the driving portion 43b is slid within a range in which the large diameter portion 55 is inserted into the insertion hole 44, the sliding range of the shaft portion 43a can be reduced. Therefore, the time from a time when the driving portion 43b starts driving up to a time when the hood member 21 is made to spring up can be reduced. Therefore, the hood apparatus for a vehicle 20 is made to effectively function.

Note that, in the first embodiment and the second embodiment, the link mechanism 25 has the intermediate link member 41. However, the present invention is not limited thereto. For example, in the hood apparatus for a vehicle 20 the intermediate link member 41 may be not used.

To concretely describe one example in a case in which the intermediate link member 41 is not used, the one end portions 33b and 34b, at the hood-side fixing member 32 side, of the first link member 33 and the second link member 34 are respectively supported at the hood-side fixing member 32 so as to turn freely directly.

At that time, for example, the solenoid device 43 is fixed to the one end portion 34b of the second link member 34. Then, the one end portion 34b may be supported at the hood-side fixing member 32 by the shaft portion 43a. Further, the solenoid device 43 may be fixed to the hood-side fixing member 32. In this case as well, the one end portion 34b may be supported at the hood-side fixing member 32 by the shaft portion 43a.

Then, when an impact force greater than or equal to a predetermined value is inputted to the front end of the vehicle body 5, the support between the second link member 34 and the hood-side fixing member 32 is released.

In this way, in a case of the structure in which the intermediate link member 41 is not used as well, the hood apparatus for a vehicle 20 can spring up the hood member 21 without separately using a dedicated spring-up mechanism.

Further, in the first embodiment and the second embodiment, it is structured such that the hood member 21 is lifted up from the front end. However, the present invention is not limited thereto. For example, it may be structure such that the front and rear of the lifting mechanism 22 is reversed, and the front side of the hood member 21 and the engine room 12 side are linked with one another, and the hood member 21 is lifted up from the end at the cabin 10 side. In this case as well, the same effect can be obtained.

Further, the hood apparatus for a vehicle 20 is used in the engine room 12. However, the present invention is not limited thereto, and the hood apparatus for a vehicle 20 may be used in, for example, a trunk room or the like. In this case, when an impact force is inputted from the end at the trunk room side of the vehicle body 5, a hood member covering the trunk room is made to spring up. In accordance therewith, the same effect can be obtained. Further, the hood apparatus for a vehicle 20 is not limited in mounting in automobiles.

Further, in the first embodiment and the second embodiment, the first and second link members 33 and 34 bridge the top end portion 13a and the hood member 21 via the vehicle-side fixing member 31 and the hood-side fixing member 32. However, the present invention is not limited thereto.

For example, the vehicle-side fixing member 31 and the hood-side fixing member 32 may be not provided. In this case, fixing portions which respectively fix the both end portions 33a and 33b of the first link member 33 and the both end portions 34a and 34b of the second link member 34 may be provided so as to be integrated with the top end portion 13a and the hood member 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A hood apparatus for a vehicle, comprising:
a hood member which is configured to close an upper opening of a chamber space portion formed in front of the cabin the vehicle;
a lifting mechanism which lifts the hood member including a link mechanism which rises up and brings down the hood member, and urging device for urging the hood member upward, the link mechanism having a first link member and a second link member shorter than the first link member, which bridge the hood member and the opening edge portion of the upper opening and which are spaced in the longitudinal direction of the vehicle, the hood member being linked to the first link member and the second link member at the opening edge portion of the upper opening to turn freely; and
uncoupling mechanism for uncoupling the second link member from the hood member when an impact force greater than or equal to a predetermined value is inputted from an front end portion of the vehicle, and wherein
the hood member is made to spring upward by an urging force of the urging device when an impact force greater than or equal to the predetermined value is inputted from the front end portion of the vehicle.

2. A hood apparatus for a vehicle according to claim 1, wherein
the link mechanism includes an intermediate link member which bridge an end portion at the hood member side of the first link member and an end portion at the hood member side of the second link member, wherein the intermediate link member and the end portion at the hood member side of the first link member are linked so as to turn freely, and the intermediate link member and the end portion at the hood member side of the second link member are linked so as to be freely rotatable, and
both of the end portion at the hood member side of the second link member and the intermediate link member are supported at the hood member via a supporting unit which is attachable and detachable to and from the hood member.

3. A hood apparatus for a vehicle according to claim 2, wherein
the uncoupling mechanism uncouples the second link member from the hood member by releasing the support at the supporting unit when an impact force greater than or equal to the predetermined value is inputted from the front end portion of the vehicle.

4. A hood apparatus for a vehicle according to claim 3, wherein
the supporting unit supports between the end portion at the second link member side of the intermediate link member and the hood member so as to be attachable and detachable.

5. A hood apparatus for a vehicle according to claim 3, wherein
the supporting unit includes
a supporting shaft which supports one end at the hood member side of the second link member and the intermediate link member, and
a supporting shaft bearing which is provided at the hood member and supports the supporting shaft.

6. A hood apparatus for a vehicle according to claim 5, wherein both of the end portion at the hood member side of the second link member and the intermediate link member are supported at the hood member due to the supporting shaft being supported by the supporting shaft bearing.

7. A hood apparatus for a vehicle according to claim 6, wherein
the uncoupling mechanism is a supporting shaft sliding mechanism which releases the support between the supporting shaft and the supporting shaft bearing by sliding the supporting shaft when an impact force greater than or equal to the predetermined value is inputted from the front end portion of the vehicle.

8. A hood apparatus for a vehicle according to claim 7, wherein
the uncoupling mechanism is a driving portion of a solenoid device supporting the supporting shaft and slides the supporting shaft when an impact force greater than or equal to the predetermined value is inputted from the front end portion of the vehicle.

9. A hood apparatus for a vehicle according to claim 7, wherein
the second link member, the intermediate link member, and the supporting shaft bearing are arranged in one direction with the supporting shaft bearing being as a starting point, and
the uncoupling mechanism releases the support between the supporting shaft and the supporting shaft bearing by sliding the supporting shaft toward the second link member side from supporting shaft bearing side when an impact force greater than or equal to the predetermined value is inputted from the front end portion of the vehicle.

10. A hood apparatus for a vehicle according to claim 1, wherein
the second link member is disposed at the side which is further toward the rear of the vehicle than the first link member.

* * * * *

UNITED STATES PATENT AND TRADEMARK OFFICE
CERTIFICATE OF CORRECTION

| | |
|---|---|
| PATENT NO. | : 6,953,220 B2 |
| APPLICATION NO. | : 10/963727 |
| DATED | : October 11, 2005 |
| INVENTOR(S) | : Makoto Takehara |

Page 1 of 1

It is certified that error appears in the above-identified patent and that said Letters Patent is hereby corrected as shown below:

Title Page,

Please insert the following:

[30]     Foreign Application Priority Data

Oct. 15, 2003   (JP)                    2003-355446

Signed and Sealed this

Fifteenth Day of May, 2007

JON W. DUDAS
*Director of the United States Patent and Trademark Office*